United States Patent [19]

Allina

[11] Patent Number: 4,901,187

[45] Date of Patent: Feb. 13, 1990

[54] ELECTRICAL TRANSIENT SURGE PROTECTION

[76] Inventor: Edward F. Allina, 605 Capri Blvd., Treasure Island, Fla. 33706

[21] Appl. No.: 123,419

[22] Filed: Jan. 12, 1988

Related U.S. Application Data

[63] Continuation-in-part of Ser. No. 923,524, Oct. 28, 1986.

[51] Int. Cl.$^4$ .............................................. H02H 9/04
[52] U.S. Cl. .................................... 361/117; 361/126; 361/127; 361/366; 361/376; 338/21
[58] Field of Search ...................... 361/58, 56, 62, 91, 361/104, 118, 126–128, 367, 366, 376, 374; 307/116; 338/21, 225 D, 22 R

[56] References Cited

U.S. PATENT DOCUMENTS

| | | | |
|---|---|---|---|
| 2,206,232 | 5/1952 | St John | 361/366 |
| 3,601,632 | 8/1971 | Frazier | 361/56 |
| 3,648,166 | 5/1972 | Redecick | 361/118 X |
| 3,894,274 | 7/1975 | Rosenberg, Jr. | 361/56 |
| 3,914,657 | 10/1975 | Melanson | 361/117 |
| 3,987,343 | 10/1976 | Cunningham | 361/118 |
| 4,502,089 | 2/1985 | Ozawa | 361/127 |

Primary Examiner—Todd E. Deboer
Attorney, Agent, or Firm—Charles A. McClure

[57] ABSTRACT

An adapter to be plugged in between a conventional watt-hour meter and an electrical power use installation socket to protect both the meter and downstream equipment from possible damage by transient surges in electrical potential resulting from lightning or similar disturbance. For the usual meter having a pair of power input terminals and a pair of power output terminals, this adapter has varistors or similar non-linear resistances connected between the input terminals and ground, to conduct away such surges. Preferably a plurality of such resistances are connected, in parallel, between each input terminal and ground, and a heat sink is connected to the grounded side of the varistors to dissipate the thermal energy resulting from the surge conduction.

15 Claims, 3 Drawing Sheets

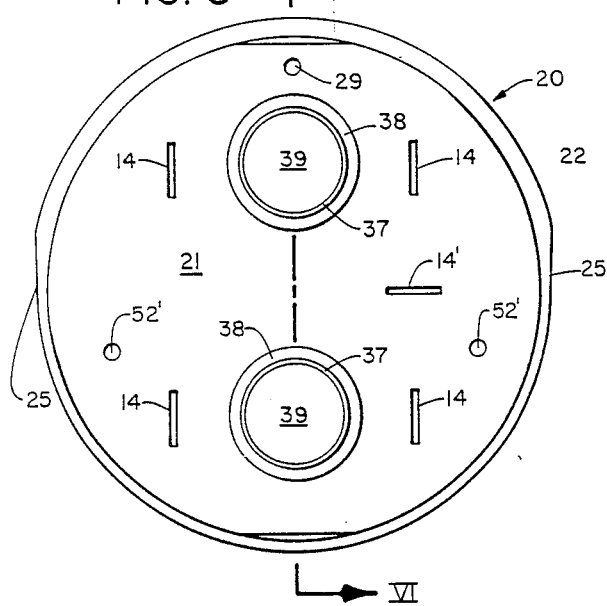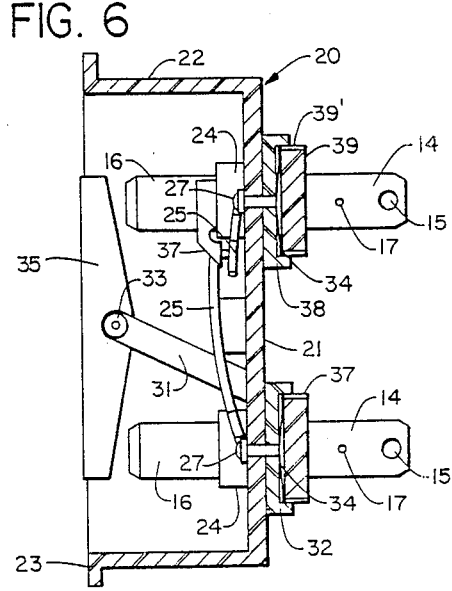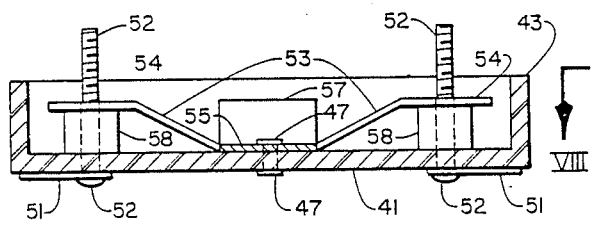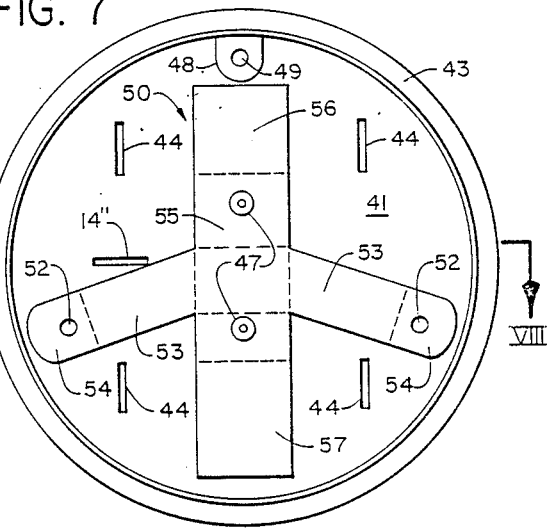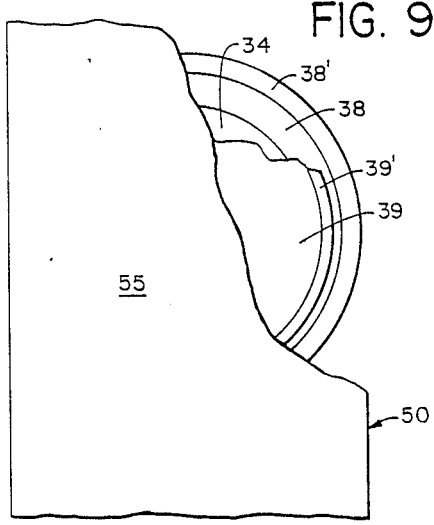

4,901,187

ELECTRICAL TRANSIENT SURGE PROTECTION

This is a continuation-in-part of my copending application, Ser. No. 923,524 filed 28 Oct. 1986, which is incorporated herein by this reference.

FIELD OF THE INVENTION

This invention relates to protection of electrical equipment from transient surges in voltage, as from an external power source, especially by means of protective apparatus interposable between a conventional watt-hour meter and electrical loads downstream.

BACKGROUND OF THE INVENTION

The desirability of protecting electrical meters and related equipment from voltage surges is well known. Similarly known are devices whose resistance varies non-linearly under applied voltage so that conduction therethrough is disproportionately greater at higher voltages than at normal lower voltages. The name "varistor" is commonly and suggestively applied to a class of such devices.

Varistors connected to provide such surge protection have been installed within meters, as in Melanson U.S. Pat. No. 3,914,657 and in Zisa U.S. Pat. No. 3,725,745; and also in devices of plug-and-jack type adapted for use between electrical outlets and appliances to be operated by electricity drawn from such outlets, as in Orfano U.S. Pat. No. 4,089,032. Plug-and-jack devices for use between such an electric meter and the premises of an electricity customer include circuit-interrupting means (switches, with or without associated fuses), as suggested by Megarian in U.S. Pat. No. 3,599,047 and by St. John in U.S. Pat. No. 2,606,232. Interposition of a varistor or similar non-linear resistor between such a meter and downstream equipment at a customer's location is less apparent, notwithstanding that a need exists for a simple effective way to provide surge protection.

SUMMARY OF THE INVENTION

In general, the objects of the present invention are attained by shunting transient surges in electrical power to ground before watt-hour meters and downstream loads are affected thereby. More particularly, this invention provides plug-and-jack means to adapt surge protection to conventional plug-in meter installations, in such a manner as to minimize the effects of such transient surges upon the protective means as well as upon the items so protected. Protection is optimized by utilizing varistors having a relatively low initial conduction voltage--and using more of them, in parallel and in conductive relationship with a heat sink, for dissipation of the energy load imposed by multiple lightning strikes, for example.

A primary object of the present invention is to enable meters of conventional electromechanical or all electronic watt-hour type to be protected from transient surge damage without modification of such a meter or of its conventional socket at a customer's location.

Another object of this invention is to utilize varistors or similar devices, in coping with transient surges, more effectively and reliably than heretofore, not only to protect such meters but also to protect power customers' electrical equipment downstream.

A further object is to provide such apparatus and methods for so protecting such meters and downstream equipment economically.

Other objects of the present invention, together with means and methods for attaining the various objects, will be apparent from the following description and the accompanying diagrams of a specific embodiment, being presented by way of example rather than limitation.

SUMMARY OF THE DRAWINGS

FIG. 5 is a rear elevation of a housing member portion of the same adapter means, whose front elevation was shown in FIG. 3, here shown disassembled from a cover plate portion thereof;

FIG. 6 is a vertical section through such adapter housing, taken at VI—VI on FIG. 5;

FIG. 7 is a front elevation of the cover plate member of such adapter means, whose rear elevation was shown in FIG. 4, here shown disassembled from the base of the housing member;

FIG. 8 is a horizontal section through such adapter cover plate, taken at VIII—VIII on FIG. 7; and FIG. 9 is a successively cut-away layered detail view of part of a portion of such apparatus including a cup-like holder;

DETAILED DESCRIPTION

Figure 1:
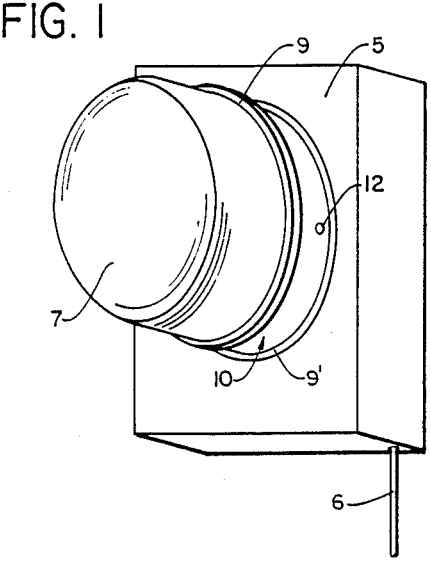
FIG. 1 is a perspective view of surge-protection adapter means of the present invention in normal use, between customary watt-hour meter means and usual meter-receiving means in a utility box.

FIG. 1 shows, in perspective, generally rectangular electrical utility box 5, which has grounding cable or rod 6 extending downward from one bottom corner. Forward and leftmost of the box is meter 7 of conventional watt-hour type, with a dome-like transparent cover extending to the left (contents not shown here). As is customary, abutting components of the assembly are retained together by a split ring adapted to surround end flanges on the respective components. As is so well known as to require no illustration here, such type of retainer ring is flexible and has a slotted part and a laminar part adapted to protrude through the slot when the ring is put in place. An opening through the protruding laminar part receives a wire that is then surrounded by a lead seal or similar means to discourage or to reveal unauthorized disconnection or tampering with the assembly.

Figure 2:
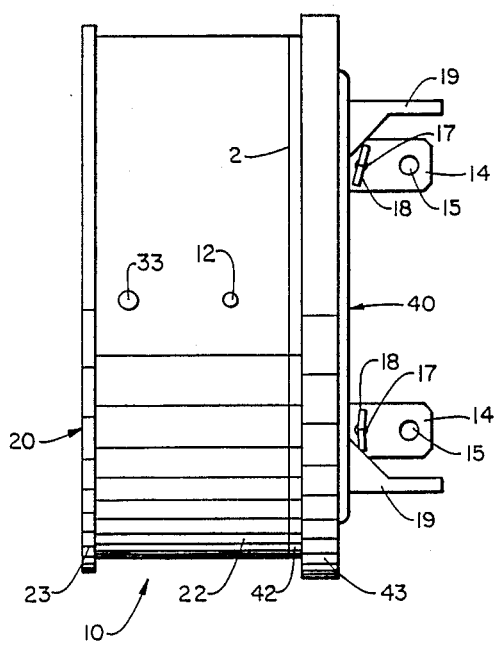
FIG. 2 is a right side elevation of the adapter means partially visible in FIG. 1, disassembled from other apparatus shown there.

FIG. 2 shows, in right side elevation, adapter means 10 of this invention disassembled from the meter and utility box of FIG. 1 and on an enlarged scale. The adapter comprises two principal members (joined together here along vertical junction line 2): open-ended cylindrical housing 20 at the left, and shallower cover plate 40 at the right. The housing member has sidewall 22, surrounded at its open (left) end by flange 23. Visible in the housing, just left of the separation line and midway from top to bottom, is condition light 12 connected (as shown later) to indicate an operative or ready condition when lit and an unready or out-of-order condition when not lit. Further left is fastener 33, discussed further below.

Protruding to the right of the cover plate are plug terminals 14 of spade type (two of four are visible), each with opening 15 near its free end and with smaller opening 17 nearer the plate and with retaining cotter pin 18 therethrough. Above and below (partly surrounding and partly hidden beyond) the spade terminals are feet 19, one visible per connector, protruding a bit farther than the terminals. It will be apparent from later views that there are two pairs of such terminals; conventionally the upper pair are for power input to the meter, and the lower pair for power out to a customer's installation and electrically powered equipment downstream.

Figure 3:
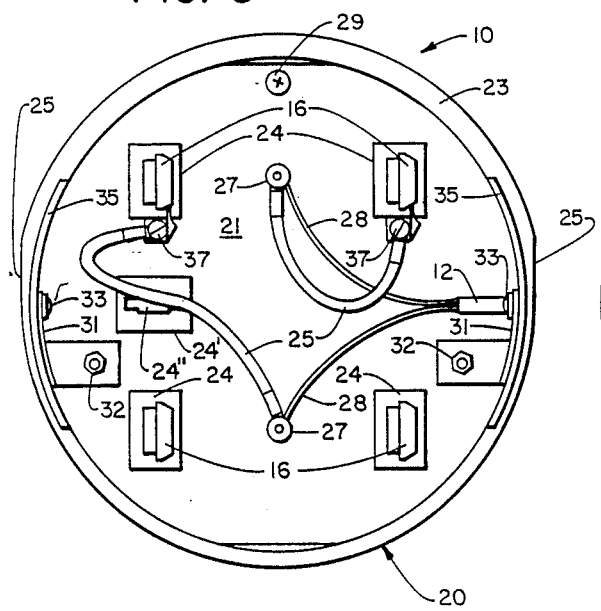
FIG. 3 is a front elevation of the same adapter means.

FIG. 3 shows, in front elevation, the open end of housing member 20 of adapter means 10, which has base 21 closing one end of cylindrical sidewall 22. Generally circular edge flange 23 at the open end has a pair of flat portions 25 at its opposite sides. Four rectangular bosses 24 rise from the base of the housing, in a nearly square layout, each with one of the previously shown spade terminals inserted into and through a close-fitting vertical slot (unnumbered). Jaws 16 of the jack end of such terminals protrude toward the viewer from the tops of the bosses. Fifth boss 24' similar to the others but oriented with slot 24" therein horizontal instead of vertical is located between the left upper and lower bosses 24— for alternative future use, not used by the present invention.

Fasteners shown in FIG. 3 and subsequent views are illustrative rather than limitative. Usually (but not always) the same reference numeral denotes all parts of any given fastener, whether alike or different, as at opposite ends. Pair of fuse links 25 connect between pair of fasteners 37 at the top pair of terminals to pair of fasteners 27 located laterally midway between the top and bottom pairs of bosses, respectively. Condition light 12 (partly hidden in a right sidewall opening) has pair 28 of leads also extending to fasteners 27. Shown between the light and the viewer is one of pair of ground straps 31, secured to fasteners 32 (one each) in the base and also to fasteners 33 (one each) in the sidewall of the housing. The respective straps are attached by the last mentioned fasteners to grounding collars 35, extending along minor lengths of the edge of the housing sidewall. Located above upper fastener 27 is fastener 29 to aid in retaining cover plate 40 onto the outside of the housing base.

Figure 4:
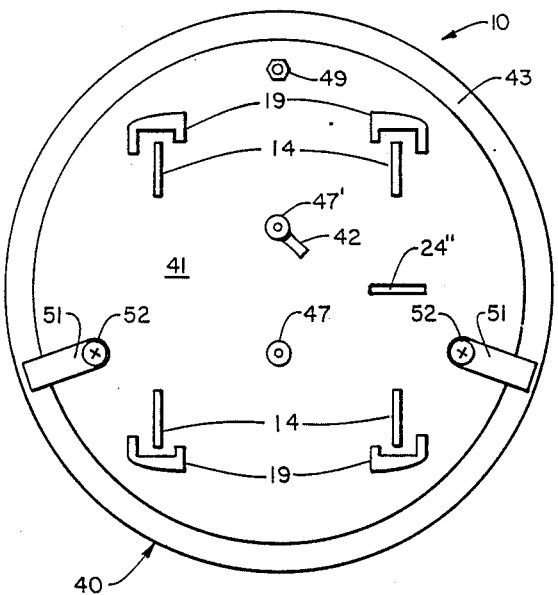
FIG. 4 is a rear elevation of the same adapter means.

FIG. 4 shows adapter means 10 in rear elevation, notably cover plate 40 and specifically the outside face of its plate 41 and edge of its surrounding flange 43. Shown symmetrically arranged in the same pattern as jaws of the terminals in FIG. 3 are spade ends 14 thereof. Partly surrounding the outer edges of the terminals are feet 19, here seen end-on. On the vertical midline (not marked) are pair of fasteners 47, 47' located a short distance below and above the horizontal midline (also not marked). Auxiliary pigtail ground connector 42 is part of the upper fastener. Above it is opposite end 49 of fastener 29 extending from the housing base (see FIG. 3). Slanting downward at both the right and left sides, from the ends of screw fasteners 52 (one each) in the plate near the edge of the flange, are pair of grounding strips 51 partly overlying that edge.

FIG. 5 shows, in rear elevation, housing base 21 of adapter means 10, whose front elevation appeared in FIG. 3. Upper and lower bores 29 appear as before. Spade terminals 14 protrude toward the viewer through corresponding slots (not visible) in the rectangular array shown previously. Unused horizontal slot 24" also appears. Midway between the respective upper and lower pairs of terminals are pair of shallow cup-shaped non-conductive holders 38 for disk-shaped varistors 39, each with non-conductive collar 39' surrounding it. Right and left flats 25 on housing flange 23 appear as before. A vertical section line is superimposed to indicate the next view.

FIG. 6 shows a vertical section through the housing member of the adapter means, at VI—VI on FIG. 5, corresponding to a leftward looking vertical section of the housing member of the adapter shown from the front in FIG. 3. Partial collar 35 is seen, in more detail than previously, along part of the edge of flange 23 and sidewall 22 and connected by fastener 33 to grounding strap 31, which terminates along the housing base as shown further in FIG. 3. One fuse link 25 is connected between fastener 37 at the upper terminal to fastener 27 located nearer the viewer than the lower terminal and surrounding boss. The other fuse link is shown (fragmentarily) connected to the corresponding fastener ahead of the upper terminal boss. The other end of each such fastener is suitably attached to one of a pair of conductive lamina 34, circular in outline, contiguous with one face of one of varistors 39, each in adjacent cup-shaped holder 38. The laminar cross-section shows a recessed central part, surrounding the head of the fastener, and a flatter annular part therearound and in actual contact with the conductive varistor face. Of course, the varistors and holders are nearer the viewer than spade terminals 14 shown extending to the right from locations behind them. Contactors (one each) for the opposite face of each varistor are carried by the cover member, as shown in the next pair of views.

FIG. 7 shows, in front elevation, cover plate 40, whose rear elevation was shown in FIG. 4. Bore 49 near the top center, just below the inner edge of flange 43, is surrounded by boss 48. Slots 44 for spade terminals 14 (not present in this view) are visible as before. The most prominent feature here is electrically conductive cruciform member 50, which has a wide body portion, extending from just below boss 48 to near the bottom inside edge of flange 43, and narrower arm portions extending therefrom. Central rectangular part 55 of the body portion adjoins upper and lower body parts 56 and 57, each of which rises toward the viewer and is sufficiently springy to provide excellent electrical contact with the underlying varistors when the cover plate is assembled to the adapter housing base. Pair of integrally formed arms extend outward and slant downward from the opposite sides of the central part of the body member. Each arm has terminal part 54, overlying boss 58 and secured by screw fastener 52 through an opening therein, interconnected to the body by inclined intermediate part 53 (separately designated here because of planar differences visible in the next view).

FIG. 8 shows cover plate 40 sectioned horizontally and viewed downward, as indicated at VIII—VIII in FIG. 7. Bosses 58 (through which screw fasteners 52 pass) underlie respective end portions 54 of cruciform member 50, raising them out of the plane of the central part of body portion 55 thereof, which is secured against the inner face of the cover plate by a pair of fasteners (see FIG. 4). Outer end of only the lower one of such conducting ends can be seen here. Intermediate portions 53 of the arms slant upward from junction with the body to junction with respective end portions 54 of member 50. Lower part 57 of the body portion of the cruciform member shown in FIG. 7 is visible rising from the plane of that part so secured.

FIG. 9 shows, on an enlarged scale and successively cut away, a portion of the apparatus of this invention shown in somewhat less detail in prior views. Shown closest to the viewer is part of the body portion of electrically conductive member 50, cut away to show some of the underlying components, including next underneath and in contact with it a face of varistor 39, with insulating collar 39'. Circumferentially surrounding the varistor is upturned edge 38' of non-conductive cuplike holder 38, which does not reach overlying conductive member 50. The varistor and its surrounding collar are cut away to reveal conductive lamina 34, which is in contact with the underlying opposite face of the varistor, and incidentally to show more of the base of the cuplike holder as well. This view is included because of the operational importance of the electrical circuitry represented by the visible components, whose functioning is considered in some detail below, where it is noted that member 50 is not only an excellent conductor of electricity but also of heat.

Figure 10A:
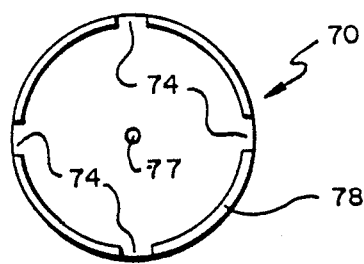
FIGS. 10A and 10B are front and side elevational views of an apparatus portion having parts modified from those in FIG. 9.
Figure 10B:
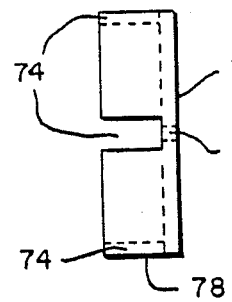

The succeeding views describe a cuplike holder and its contents modified from the corresponding apparatus portion of FIG. 9. Thus, FIGS. 10A and 10B show modified cuplike holder 70 from the front and side, respectively. Sidewall 78 has four like slots 74 formed at 90° intervals therethrough from its free edge to but not into base 72. Central bore 77 is adapted to receive a fastener (not shown) similar to grounding fastener 27 in the previously shown embodiment (FIG. 6). The purpose of slotting the sidewall will become apparent after all succeeding views have been described.

Figure 11A:
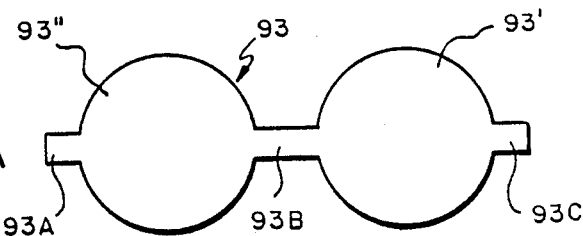
FIGS. 11A and 11B are flat views of a pair of like laminar parts in the apparatus portion of FIG. 10.
Figure 11B:
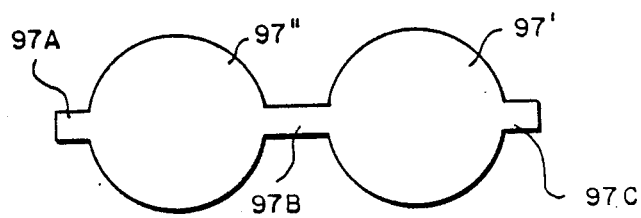

FIGS. 11A and 11B are flat views of pair of spectacle-shaped (identical) laminar electrical conductors 93 and 97 useful in the embodiment of FIG. 10. Thus, conductor 93 has two round disklike parts 93' and 93" interconnected by narrow bight 93B and flanked by tabs 93A and 93C extending to the left and right, respectively. Likewise, conductor 93 has round parts 93' and 93" connected by bight 93B and flanked by tabs 93A and 93C at the left and right.

Figure 12A:
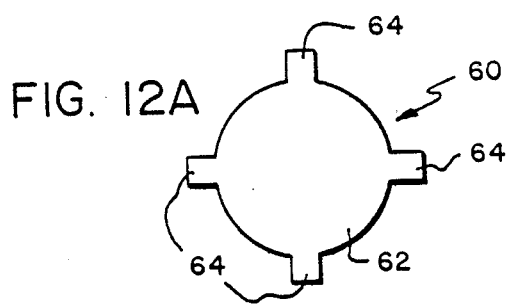
FIGS. 12A and 12B are flat views of respective dissimilar laminar parts of such apparatus portion.
Figure 12B:
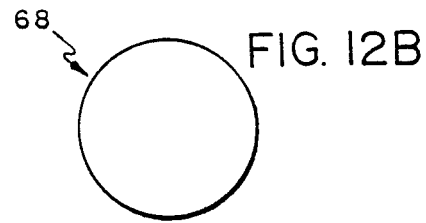

FIGS. 12A and 12B are flat views of dissimilar laminar parts of such modified apparatus embodiment. FIG. 12A shows insulating disk 60 having four tabs 64 extending from circular body part 62 at 90° intervals and otherwise much like the tabs of the conductors in the preceding pair of views. FIG. 12B shows round conductive disk 68, which is like conductive lamina 34 of the previous embodiment.

Figure 13:
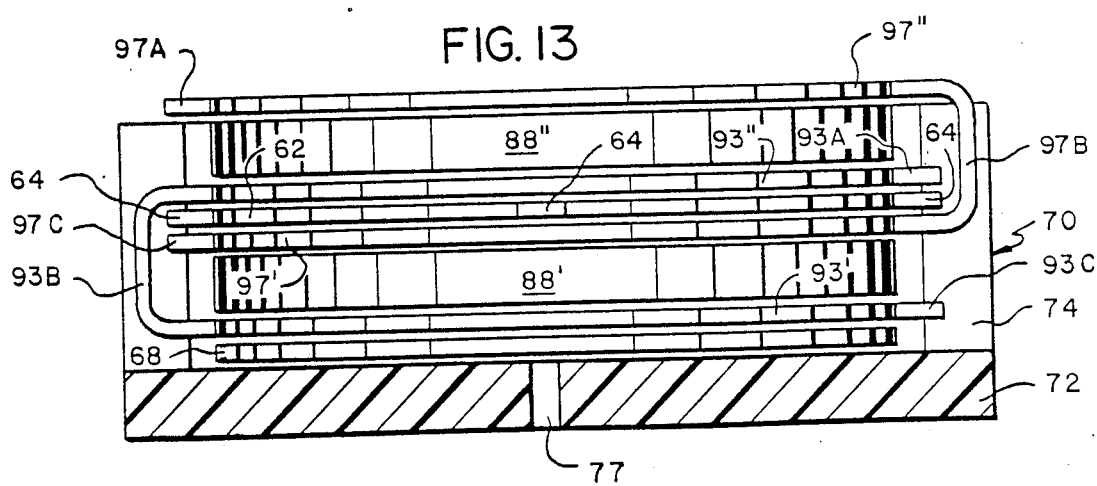
FIG. 13 is a sectional elevation through such modified holder with the parts of FIGS. 11A, 11B, 12A, and 12B assembled therein.

FIG. 13 shows the parts of the modified embodiment of FIG. 10 and preceding views assembled in operating order and sectioned for clarity of illustration—also rotated a quarter turn to fit in the allotted space. Cuplike holder 70 is sectioned diametrally through its base 72 and has sidewall 74 upstanding therefrom with slots 74 at the left and right. Resting agains the inside surface of base 72 is conductive disk 68—in position to be contacted by an equivalent (not shown) of grounding fastener 27 of the previous embodiment. Two varistors 88' and 88" with respective insulating collars 89' and 89" overlie disk 88 but without contacting it directly. Formerly spectacle-shaped lamina 93, now with bight 93B bent C-fashion, has its disklike part 93' between base disk 68 and the near (lower, in this view) face of varistor 88' and has its disklike part 93" between the corresponding face of varistor 88" and insulating disk 64, which is between the respective varistors—though not in contact with each. Formerly spectacle-shaped lamina 97, now with bight 97B bent oppositely, has its disklike part 97' between the far (upper) face of varistor 88' and insulating disk 64 and has its disklike part 93" overlying the far face of varistor 88" at the open end of the holder, in position to be contacted by body parts 56 and 57 of conductive member 50 (not shown here, see FIGS. 7 and 9). The earlike end tabs of the laminar conductors and of the insulating disk fit into the slots in the holder as shown. If so desired, slots 74 in the holder may be merely recesses on the inside of sidewall 78, so that the tabs are insulated from the exterior.

The effect of the assembled arrangement of parts in FIG. 13 is to place the pair of varistors in parallel electrically, enhancing their energy-handling capability, as is useful with varistors that conduct—and protect—at lower voltages and are correspondingly less massive individually than their higher-voltage counterparts.

Operation of the apparatus of this invention will be readily understood. In the event of an electrical transient that exceeds the usual power voltage sufficiently to pose an equipment hazard, i.e., a "surge", it appears across the power input terminals (the top pair) and is conducted by the fuse links to the varistors. In a very short time, varistor conduction occurs and bleeds the surge harmlessly off to ground via the intervening conductive elements. It will be understood that a path is provided to the grounding rod or cable via cooperating conductors (not shown) with which contact is made upon assembling the adapter means to the electrical utility box (into whose socket the meter usually is plugged, in the absence of the adapter means of this invention).

Perhaps not so apparent is the fact that the current flow in a lightning-induced surge, even for only a few microseconds to a millisecond or so, may result in a current density of hundreds or even thousands of amperes per square centimeter. Despite the low resistance of the path followed within the adapter, the resulting heat to be dissipated may be appreciable. To limit increase in "watts loss" via the varistors, which conduct even more readily at increased temperature, the immediate conductor (part of member 50) on the grounded side of the varistors functions as a heat sink, as well as a current conductor. The heat sink also tends to reduce the possibility of flashover, shorting, or other damage to the varistors. A thickness of at least about a millimeter or so over much of the surface area of the cover plate conveniently gives the heat sink enough mass to absorb a very considerable amount of thermal energy without excessive temperature rise. The heat-sinking action enables the adapter—and the meter protected by it—to withstand repeated lightning surges or similar intermittent disturbances without any failure or damage to the varistors or other parts.

The heat sink conveniently is made up of a metal having high electrical conductivity, thermal conductivity, and heat capacity. Copper is preferred, but aluminum (which will occupy several times as much space as an equivalent mass of copper) is also suitable. A couple grams of either will take up several joules (about a dozen calories) of heat energy for each degree of rise in temperature. If the higher cost is acceptable, silver—not to mention gold—is an excellent choice.

Surge-generated heat collected in large part by the heat sink is subsequently conveyed away—usually mostly by conduction, partly by convection, and even less by radiation—to the environment. A multiplicity of such surges can be accommodated while increasing the temperature of a suitable heat sink only relatively few degrees, whereas collection of the equivalent amount of heat energy by the varistors or by sensitive meter parts risks adverse effects upon them or their functioning.

In the event of a more sustained surge, as from some fault in power generation or transmission, resultant melting of one of the fuse links soon disconnects the power from the indicator light, a gas-filled (e.g., neon) glow lamp or a light-emitting diode, for example. Observation that the light is out prompts inspection and temporary replacement of the unit for inspection and testing, to be followed by whatever maintenance may prove necessary.

The varistors themselves, which comprise chiefly sintered metal compositions, such as zinc oxide or silicon carbide, together with lesser amounts of other important materials, are quite rugged and can stand a good deal of electrical abuse. They are articles of commerce and can be obtained in a wide range of voltage and current capacities through electrical equipment manufacturers or dealers.

The other components of the adapter apparatus of this invention are also readily available in ordinary trade channels. The housing and cover members may be adapted from standard articles or may be redesigned specifically for this purpose. They are composed of common non-conductive plastic materials, with or without reinforcing additives. Glass-fiber reinforced polyester and ABS are examples of the many suitable compositions available.

Advantages of using the surge-protective adapter apparatus of this invention have been mentioned above, and others will be readily apparent. A watt-hour meter already in use can be protected simply by unplugging it and plugging the adapter in its place, and then plugging the meter into the adapter. Existing meter designs do not have to be redesigned at considerable expense and possible delay in availability to incorporate varistors or equivalent protective means because the adapter renders such redesign unnecessary.

Electrical power customers benefit because the protection also protects their appliances, computers, radio or television receivers, and other sensitive loads from the same surges. Such protection is as worthwhile for their equipment as it is for the power company's meters. Providing such protection will benefit the power company indirectly as well as directly.

Although the foregoing description and accompanying diagrams featured a specific embodiment, modifications or variants have been suggested, and others will come readily to mind. If desired, spark gaps or high-power diodes may be inserted in conjunction with the varistors to eliminate current conduction at power voltages. More complex but otherwise equivalent adapter apparatus may be provided for multi-phase power operations by extending these principles of design and operation, as will be apparent to persons skilled in the related arts after having been made aware of the present disclosure.

Other variations may be made in the apparatus and methods of this invention, as by adding, combining, deleting, or subdividing parts or steps, while retaining at least some of the advantages and benefits of the invention, which itself is defined in the following claims.

The claimed invention:

1. In electrical apparatus containing a plurality of disklike varistors of given diameter and thickness protective against lightning or other source of transient electrical surges, as via an available ground connector, the improvement in insulated means for holding such varistors, comprising
   - a base having a diameter greater than the varistor diameter and an opening therein to accommodate electrical conducting means in contact with one face of a varistor in such holding means, and
   - a circumferential sidewall upstanding from the base and having recessed therein at intervals therearound to accommodate connection to other electrical conducting means,
   - wherein such other electrical conducting means includes as parallel connectors thereof
     - a first such connector with a pair of conductive laminae interconnected by a flexible conductive bight curved to oppose the laminae spaced apart in contact with corresponding first faces of a pair of such varistors, and
     - a second such connector with a pair of conductive laminae interconnected by a flexible conductive bight curved to oppose the laminae spaced apart in contact with corresponding second faces of the same pair of varistors.

2. Assembly of surge protective apparatus in insulated holding means adapted to hold varistors of given diameter and thickness and protective against lightning or other source of transient electrical surges, comprising
   - a first pair of conductive laminae interconnected by a flexible conductive bight curved and juxtaposing the laminae spaced apart in contact with respective first faces of a pair of varistors therein, and
   - a second pair of conductive laminae interconnected by a flexible conductive bight curved and juxtaposing the laminae spaced apart in contact with respective second faces of the same pair of varistors.

3. Assembly of surge protective varistors according to claim 2, including an insulating disk interposed between the lamina of the first pair thereof and the lamina of the second pair thereof contacting respective adjacent varistor faces.

4. Assembly of surge protective varistors according to claim 3, wherein the laminae have earlike tabs extending from the edges thereof opposite the bights joining respective pairs of laminae, and the insulating holding means is recessed to accommodate such tabs.

5. Assembly of surge protective varistors according to claim 4, wherein the insulating disk has earlike tabs extending from it at circumferential intervals therealong accommodated in such recesses.

6. Assembly of surge protective varistors according to claim 5, wherein the insulated holding means has a cylindrical sidewall slotted to accommodate such bights and such tabs, and the axial extent of the assembly is greater than that of the sidewall.

7. Surge protective apparatus adapted to hold varistor disks in means for retrofitting electrical utility meters with protection against surge damage from lightning or other electrical transient, provided with power from a plurality of input terminals, comprising cylindrical holder means, one per power input terminal, each of given diameter and axial extent, accommodating between a power input terminal and ground, a pair of varistor disks of smaller diameter than such holder diameter and thickness about half such holder axial extent; and electrically conductive means connecting the varistor disks in parallel with each other between such power input terminal and external grounding means, including a first pair of conductive laminae, respectively contacting the first face of the respective disks, and a second pair of conductive laminae, respectively contacting the second face of the respective disks, and for each pair a conductive bight interconnecting its respective laminae.

8. Surge protective apparatus according to claim 7, including an insulating disk between the second lamina of the first pair, contacting the second face of the first disk, and the first lamina of the second pair, contacting the first face of the second disk.

9. Surge protective apparatus according to claim 8, wherein such electrically conductive means for the varistors have tabs opposite such bights, both bights and tabs extending therefrom at circumferential intervals, and such holder cylindrical wall is slotted at like intervals to accommodate such bights and such tabs.

10. A method of increasing the current capacity of varistor means, connected between a power lead and a ground lead to protect against transient electrical surges, comprising the steps of including in such means first and second disklike varistors, each such varistor having first and second conductive faces, stacking the first and second varistors in a single column, with the first face of the second varistor adjacent the second face of the first varistor, and connecting the varistors in parallel circuit by symmetrically interleaving a plurality of substantially U-shaped laminar electrical conductors and a laminar insulator in the column, including contacting a first face of the first varistor and a first face of the second varistor with a first such conductor, contacting a second face of the first varistor and a second face of the second varistor with a second such conductor, and such interposing a laminar insulator between the part of the first conductor contacting the first face of the second varistor and the part of the second conductor contacting the second face of the first varistor and thereby spacing such parts apart.

11. Method according to claim 2, including the step of laterally enclosing such column with a non-conductive wall.

12. Method according to claim 3, including the step of providing slots in such wall to provide vertical pathways for the bights of the respective U-shaped conductors.

13. Method according to claim 3, including the step of providing a laminar conductor at the bottom of the stack, in contact with the part of the second laminar conductor in contact with the second face of the second varistor.

14. An assemblage of disklike varistors with conductive opposite faces and given diameter and thickness, in electrical transient surge protection apparatus, comprising insulated holding means having a cylindrical sidewall with its internal diameter sufficiently larger than the varistor diameter to accommodate the varistors coaxially therewithin;

a first varistor having first and second such faces, and a second varistor having first and second such faces, so assembled within the holding means with the second face of the first varistor adjacent the first face of the second varistor;

a first pair of conductive laminae interconnected by a flexible conductive bight curved and juxtaposing the laminae spaced apart into contact with respective upper faces of the respective varistors, and a second pair of conductive laminae interconnected by a flexible conductive bight curved and juxtaposing the laminae spaced apart into contact with respective second faces of the same pair of varistors;

and an insulating disk interposed between (i) the lamina of the first pair in contact with the second face of the first varistor and (ii) the lamina of the second pair in contact with the first face of the second varistor.

15. Assemblage of surge protective apparatus according to claim 14, wherein each lamina in each conductive pair has an earlike tab protruding beyond the given diameter opposite connection of the bight thereto, and the cylindrical wall is recessed or slotted to accommodate such ears and the bights themselves.

* * * * *